United States Patent
Schwinn

(10) Patent No.: US 6,761,948 B2
(45) Date of Patent: Jul. 13, 2004

(54) RELEASE FOIL

(75) Inventor: Georg Schwinn, Gronau (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 0 days.

(21) Appl. No.: 10/269,320

(22) Filed: Oct. 11, 2002

(65) Prior Publication Data

US 2003/0087055 A1 May 8, 2003

(30) Foreign Application Priority Data

Oct. 11, 2001 (DE) .......................................... 101 50 028

(51) Int. Cl.[7] .............................................. A61F 13/02
(52) U.S. Cl. ................... 428/41.3; 428/41.5; 428/41.7; 428/346; 428/349; 428/352; 428/354; 428/451
(58) Field of Search ............................... 428/41.3, 41.5, 428/41.7, 346, 349, 352, 354, 451, 40.1, 447, 516, 517, 520, 521, 522

(56) References Cited

U.S. PATENT DOCUMENTS 5,942,326 A * 8/1999 Ecoff et al. .................. 428/341
6,210,767 B1 4/2001 Knauf ........................ 428/40.1

FOREIGN PATENT DOCUMENTS

DE 195 48 265 6/1997

* cited by examiner

*Primary Examiner*—D. S. Nakarani
(74) *Attorney, Agent, or Firm*—Collard & Roe, P.C.

(57) ABSTRACT

A release foil comprising a plastic carrier and a silicone coating forming a layer with low adhesion versus an adhesive layer of a substrate laminated to it. According to the invention, the plastic carrier comprises a barrier layer for absorbing substances migrating out of the adhesive layer. The barrier layer consists of an ethylene-vinyl-acetate copolymer, ethylene-(meth)acrylic acid copolymer, or styrene block copolymer, or mixtures of said components.

8 Claims, 1 Drawing Sheet

RELEASE FOIL

BACKGROUND

The invention relates to a release foil having a plastic carrier and a silicone coating forming a layer with low adhesion versus an adhesive layer of a substrate laminated to it.

There is an increasing demand for self-adhesive products such as labels, adhesive tapes, and adhesive foil materials for application in the field of construction. In most cases, the adhesive layer of self-adhesive products is covered with a foil that can be peeled off. This foil is referred to as a release foil (or sheet). Due to its silicone coating, the release foil can be easily removed from the adhesive layer. In addition to its cover function, the release foil must also act as a carrier especially in connection with labels. This permits automatic or manual dispensing of pre-punched labels.

Silicone-coated release papers are widely used and can be easily handled because of their thickness and stiffness. However, they are disadvantageous due to the roughness of the paper carrier. Furthermore, such release papers are not used for optical reasons because they are not transparent in connection with highly transparent labels and the desired "non-label look" is not obtained. U.S. Pat. No, 6,210,767 describes a release layer carrier based on paper that has a surface coating consisting of polypropylene or polypropylene copolymer. The silicone coating is applied to the coated surface of the paper carrier.

A release foil is known from DE 195 48 265 A1 that has a plastic carrier. This plastic carrier consists of a stretched thermoplastic polyolefin sheet that is refined with a polymer surface coating. The surface coating, which is thinly applied, preferably consists of polyethylene or polypropylene and is said to favorably influence the punching and sliding properties of the release foil.

Many products coated with adhesive, which are covered with a release foil, contain so-called tackifiers in the adhesive coating in addition to the hot melt adhesive. These tackifiers provide the cold hot melt adhesive with its adhesive properties. Tackifiers, as well as other low-molecular, wax-, oil- or fat-type substances of the adhesive coating (migrating substances), are capable of penetrating the usual cover foils (or sheets). The substances migrating to the outside without having lost their adhesive properties may cause individual product units to be glued to each other.

Products provided with release foils are frequently packaged in polyethylene foils. Migrating substances of the adhesive layer may penetrate not only the release foil but also the outer packaging foil. The pack may therefore glue together in the region of the polyethylene foils. This impairs the use of the products because when an individual pack is opened, the packaging glued with the pack may tear open or cause the release foil to detach prematurely and expose the adhesive coating.

To prevent the tackifier resin or the other migrating components of the adhesive from migrating through foils, release foils have special barriers, for example metal foils. Foils containing metal layers are expensive. These foils may contain aluminum, or be based on polyamide or polyacrylic resin, which are employed as barrier foils as well.

The invention is based on the problem of providing a release foil that is transparent and effectively prevents low-molecular organic substances from migrating out of the adhesive layer.

SUMMARY

Based on a release foil with the features specified above, the plastic carrier of the present invention comprises a barrier layer for absorbing substances migrating out of the adhesive layer, whereby the barrier layer consists of an ethylene-vinyl-acetate copolymer, ethylene-(meth)acrylic acid copolymer, styrene block copolymer, or mixtures of said components. The migrating substances are absorbed or bonded in the barrier layer. It is understood that the barrier layer must have a sufficient thickness. The necessary layer thickness of the barrier layer depends on the composition of the adhesive and the thickness of the adhesive layer and can be determined by a few orienting trials. In general, a layer thickness of at least 30% of the thickness of the adhesive layer is sufficient, but it can not fall below a minimum value of 5 µm. Suitable styrene block copolymers are styrene-ethylene-styrene block copolymers, styrene-(ethylene-1-butene)-styrene copolymers, and styrene-isoprene-styrene copolymers.

The silicone layer, a layer of low adhesion is in contact with the adhesive layer. The usual silicone liner materials such as triorgano-siloxane derivatives, dimethyl-siloxane systems, terminally blocked polyorgano-siloxanes, methyl-vinyl-polysiloxanes, and acrylated organo-polysiloxanes, which are offered in the market, for example under the trade name SYL-OFF® (DOW Corning CO. USA), can be employed as silicone layers. The siliconization is carried out from the aqueous or organic solvent phase, or free of solvent, in amounts ranging from about 0.3 g/m$^2$ to 1.5 g/m$^2$.

When the migrating substance exiting from the adhesive layer penetrates the silicone layer, it impacts the absorbent barrier layer, which, on account of its composition and layer thickness, has high affinity and bonding power versus the migrating substances. By being absorbed and bonded, the migrating substances are prevented from migrating to the outside.

According to a preferred embodiment of the invention, the plastic carrier is produced in the form of a co-extruded foil, which, in addition to the barrier layer, comprises at least one other layer consisting of co-extrudable plastic, preferably a polyolefin. This additional layer that is co-extruded together with the barrier layer, is usefully arranged between the barrier layer and the silicone coating. It preferably consists of one or more polyolefins, in particular polyethylene, polypropylene, or polybutylene. The intermediate polyolefin layer may contribute to increasing the compatibility between the silicone layer and the absorbing barrier layer. This results in superior stability and processibility of the foil.

According to a further development of the invention, the release foil is comprised of four layers and consists of a silicone layer followed by a polyolefin layer, or a layer consisting of plastics that can be suitably co-extruded, followed by the absorbing barrier layer and another polyolefin layer.

The application of the absorbing barrier layer, can be applied also—mutatis mutandis—to foils not equipped with a silicone layer. For example, the absorbent barrier layer may be provided on one or both sides with an additional layer containing a polyolefin or consisting of a polyolefin. It is possible in this way to produce laminated composites, in which the three-layered foil described above is provided with an adhesive, whereby the substances capable of migrating and exiting from the adhesive are absorbed by the absorbent barrier layer, so that no inter-blocking can occur when a web of material so produced is reeled up.

Finally, when the release foil is used for packagings, it is possible to produce pouches from foils that consist of the described absorbent barrier layer and polyolefin layers applied to both sides. The three-layered barrier layer is accordingly comprised of one absorbent layer that consists of one or more polyolefin copolymers and/or styrene block copolymers. In this case, too, it is possible to use ethylene-vinyl-acetate copolymer, ethylene-(meth)acrylic acid copolymer, styrene-ethylene block copolymer, styrene-(ethylene-1-butene)-styrene copolymer, styrene-isoprene-styrene copolymer, or mixtures of these components as the absorbing components. The absorbent layer serves the purpose of absorbing migrating substances exiting from the filled material, so that such substances will not completely migrate through the packaging pouch foil and contaminate the surface of the pouch.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
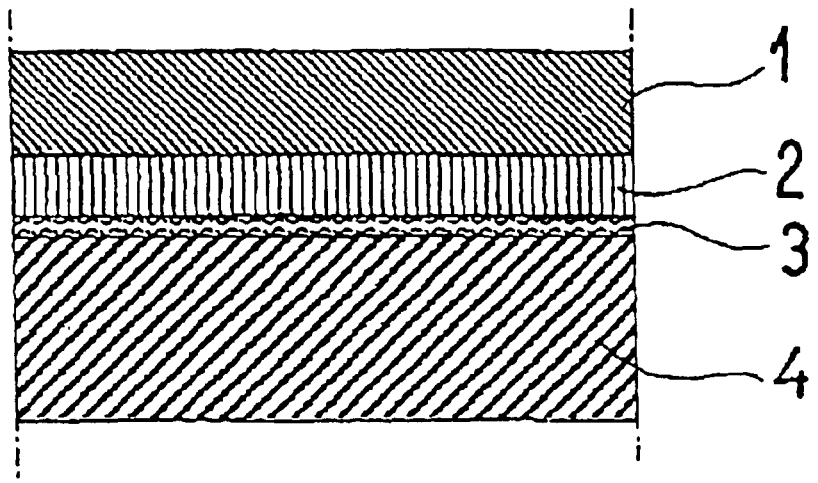
FIG. 1 shows a release foil with a plastic carrier and a silicone coating.

FIG. 1 shows a release foil with a plastic carrier and a silicone coating. The plastic carrier consists of a foil of ethylene-vinyl-acetate copolymer (60% by wt. ethylene; 40% by wt. vinyl acetate) produced by blow extrusion. This foil forms an absorbent barrier layer 4. Barrier layer 4 has a thickness of 35 μm and is coated solvent-free with a silicone 3 having an oily consistency. Silicone coating 3 has a layer thickness of 1.5 μm.

A substrate 1 consisting of non-stretched HDPE with a thickness of 30 μm is laminated to the two-layer release foil 3, 4 with the help of a layer 2 of a pressure-sensitive adhesive having a thickness of 22 μm. After substrate 1 has been peeled off, it can be used as a self-adhesive product.

Migrating substances exiting from adhesive layer 2 are capable of penetrating silicone layer 3; however, such substances are trapped by absorbent barrier layer 4, so that no inter-blocking of the individual layer can occur, for example when a web of foil having the layer structure shown in FIG. 1 is wound.

Figure 2:
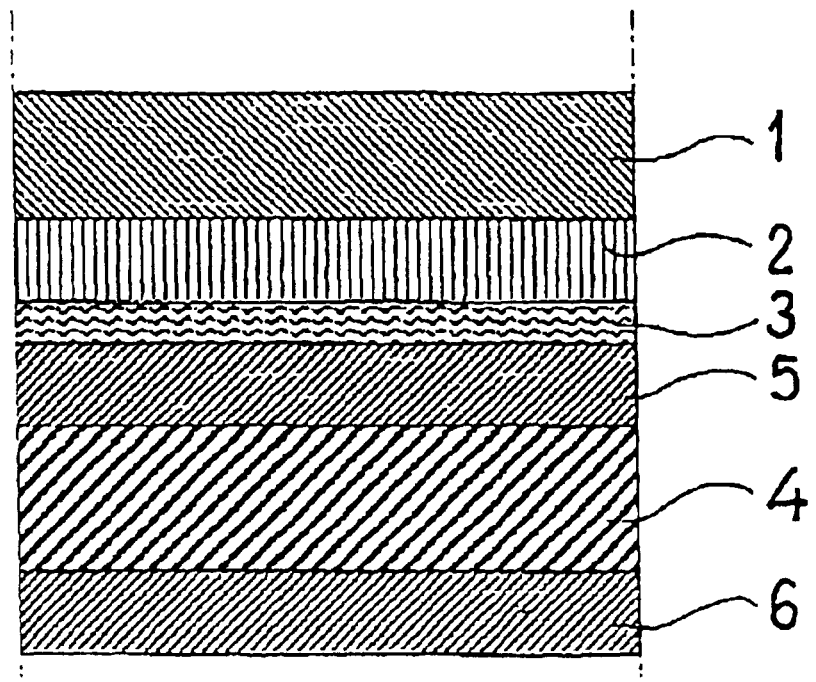
FIG. 2 shows a release foil with a plastic carrier and silicone coating including two outer polyethylene layers.

The release foil shown in FIG. 2 is comprised of a three-layer co-extrudate produced by blow extrusion and comprising two outer polyethylene layers 5 and 6 consisting of LDPE and having a thickness of 20 μm, and a barrier layer consisting of extrudable ethylene-vinyl-acetate copolymer (75% by wt. ethylene; 25% by wt. vinyl acetate) and having a thickness of 40 μm. The co-extrudate forming the plastic carrier of the release foil is provided on the top side with silicone coating 3 (consisting of cross-linkable silicone acrylate, to which different cross-linking agents, including EO-TMPTA, among others, are admixed). Following a betatrone cross-linking treatment, adhesive layer 2 consisting of cooled hot melt adhesive was applied to silicone coating 3. The hot melt adhesive contained 7% by weight of a terpene oligomer as the tackifier. Furthermore, an HDPE foil was laminated to substrate 1. After the substrate has been peeled off, it is provided with the adhesive layer and can be used as a self-adhesive product.

It was observed that after a dwelling time of 24 hours, the tackifier had penetrated layers 3 and 5 of the release foil and had migrated into absorbent layer 4. The tackifier was bonded in the latter, so that outer PE-layer 6 had not been touched and penetrated.

Accordingly, while at least one embodiment of the present invention has been shown and described, it is to be understood that many changes and modifications may be made thereunto without departing from the spirit and scope of the invention as defined in the appended claims.

What is claimed is:

1. A laminate comprising a release foil and a substrate having an adhesive layer, the release foil comprising:

a plastic carrier having a barrier layer for absorbing substances migrating from the adhesive layer, and a silicone coating on said barrier layer, wherein said silicone coating forms a layer of low adhesion versus the adhesive layer;

wherein said barrier layer is comprised of a material selected from the group consisting of: ethylene-vinyl acetate copolymer, ethylene-(meth)acrylic acid copolymer, styrene block copolymer, and mixtures of said components.

2. The laminate according to claim 1, wherein said plastic carrier is a co-extrusion foil further comprising at least one other layer of a co-extruded plastic.

3. The laminate according to claim 2, further comprising an intermediate polyolefin layer disposed between said barrier layer and said silicone coating.

4. The laminate according to claim 2, further comprising a dimensionally stabilizing polyolefin layer on a side of said barrier layer facing away from said silicone coating.

5. A release foil for use with a substrate having an adhesive layer, the release foil comprising:

a plastic carrier having a barrier layer for absorbing substances migrating from the adhesive layer; and a silicone coating on said barrier layer, wherein said silicone coating forms a layer of low adhesion versus the adhesive layer;

wherein said barrier layer is comprised of an material selected from the group consisting of styrene block copolymer, styrene-ethylene-styrene block copolymer, styrene-(ethylene-1-butene) styrene copolymer, styrene-isoprene-styrene copolymer, and mixtures of said components.

6. The release foil according to claim 5, wherein said plastic carrier is a co-extrusion foil further comprising at least one other layer of a co-extruded plastic.

7. The release foil according to claim 6, further comprising an intermediate polyolefin layer disposed between said barrier layer and said silicone coating.

8. The release foil according to claim 6, further comprising a dimensionally stabilizing polyolefin layer on a side of said barrier layer facing away from said silicone coating.

* * * * *